United States Patent
Yamamoto et al.

(10) Patent No.: US 7,923,150 B2
(45) Date of Patent: Apr. 12, 2011

(54) NON-AQUEOUS ELECTROLYTE SECONDARY BATTERY

(75) Inventors: Teruaki Yamamoto, Osaka (JP); Tomohiro Ueda, Nara (JP); Shinichi Waki, Osaka (JP); Youko Sano, Osaka (JP); Yasuhiko Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 968 days.

(21) Appl. No.: 11/503,204

(22) Filed: Aug. 14, 2006

(65) Prior Publication Data
US 2007/0048611 A1    Mar. 1, 2007

(30) Foreign Application Priority Data
Aug. 26, 2005  (JP) .................. 2005-245613

(51) Int. Cl.
*H01M 4/38* (2006.01)
*H01M 4/505* (2006.01)
(52) U.S. Cl. .................... 429/218.1; 429/224
(58) Field of Classification Search .......... 429/218.1, 429/231.1, 224
See application file for complete search history.

(56) References Cited

U.S. PATENT DOCUMENTS

| | | | | |
|---|---|---|---|---|
| 6,235,427 | B1 * | 5/2001 | Idota et al. | 429/218.1 |
| 6,334,939 | B1 * | 1/2002 | Zhou et al. | 204/409 |
| 6,632,564 | B1 * | 10/2003 | Takahashi et al. | 429/188 |
| 2003/0134200 | A1 | 7/2003 | Tanaka et al. | |
| 2005/0053835 | A1 * | 3/2005 | Atsumi et al. | 429/218.1 |
| 2006/0093914 | A1 | 5/2006 | Tanaka et al. | |

FOREIGN PATENT DOCUMENTS

| | | |
|---|---|---|
| CN | 1619866 A | 5/2005 |
| JP | 07-335201 | 12/1995 |
| JP | 11-233155 | 8/1999 |
| JP | 2000-243449 | 9/2000 |
| JP | 2001-243943 | 9/2001 |
| WO | WO 2004/091016 A1 | 10/2004 |
| WO | WO 2004086539 A1 * | 10/2004 |

OTHER PUBLICATIONS

Chinese Office Action, with English Translation, issued in corresponding Chinese Patent Application No. CN 2006101214605, dated on Jan. 25, 2008.
Wang, G.X. et al. "Innovative nanosize lithium storage alloys with silica as active centre," Journal of Power Sources 88 (2000) pp. 278-281.
Chinese Office Action issued in Chinese Patent Application No. 2006101214605, dated Aug. 22, 2008.

* cited by examiner

*Primary Examiner* — Gregg Cantelmo
(74) *Attorney, Agent, or Firm* — McDermott Will & Emery LLP (57) ABSTRACT

A non-aqueous electrolyte secondary battery including a positive electrode, a negative electrode, and a non-aqueous electrolyte. The positive electrode includes a positive electrode active material that comprises a lithium-containing manganese oxide, and the negative electrode includes a negative electrode active material that comprises silicon and a transition metal element. When the battery voltage is 0 V, the positive electrode and the negative electrode have a potential of 1.8 V or higher relative to lithium metal (Li/Li$^+$). Since the deterioration of the positive and negative electrode active materials is suppressed, this non-aqueous electrolyte secondary battery has both high capacity and excellent deep discharge cycle life.

10 Claims, 3 Drawing Sheets

NON-AQUEOUS ELECTROLYTE SECONDARY BATTERY

BACKGROUND OF THE INVENTION

Non-aqueous electrolyte secondary batteries, particularly lithium secondary batteries, have high electromotive force and high energy density, so they are widely used as the main power source for mobile communication devices and portable electronic devices. Also, there is an increasing demand for non-aqueous electrolyte secondary batteries as memory back-up power sources. Portable electronic devices have been undergoing remarkable developments and are becoming increasingly smaller in size, increasingly higher in performance, and free of maintenance, thereby creating a strong demand for non-aqueous electrolyte secondary batteries with higher energy density.

From the viewpoint of heightening the capacity of lithium secondary batteries, silicon materials have been receiving attention as negative electrode materials with a larger theoretical capacity than that of carbon materials. The theoretical capacity of silicon is larger than those of graphite, aluminum and the like.

However, crystalline silicon undergoes volume changes when it absorbs or desorbs lithium ions during charge/discharge, and the rate of such volume expansion is about four times at maximum. Thus, when silicon is used as an active material, it becomes pulverized due to distortion upon volume change, so that the electrode structure is destroyed.

Japanese Laid-Open Patent Publication No. 2000-243449 proposes the use of a silicon oxide as a negative electrode active material. When a silicon oxide absorbs lithium ions, its structure changes into a microcrystalline structure composed of a lithium-silicon alloy and a lithium oxide. As a result, even when it undergoes volume changes and distortion, its strength is increased and its pulverization is suppressed. On the other hand, when the negative electrode active material releases lithium ions until it is fully discharged, the lithium-silicon alloy changes into silicon and the lithium oxide does not change. However, in actual use of batteries, the negative electrode active material is not fully discharged. Therefore, when the negative electrode active material is in a discharged state, it is composed of a lithium-silicon alloy with a reduced lithium content and a lithium oxide.

Clock back-up power sources for digital still cameras, etc. are often left in the device, but do not usually have a protective circuit or the like to cut discharge. As a result, such back-up power sources are often discharged (deeply discharged) until the battery voltage lowers to near 0 V. Hence, cycle life characteristics in charge/discharge cycles including deep discharge (hereinafter referred to as deep discharge cycles) are particularly important for back-up power sources.

When a manganese oxide is used as a positive electrode active material and graphite is used as a negative electrode active material, if such a battery is discharged at a low rate such as about 0.1 C (1 C is a 1 hour-rate current) until the battery voltage lowers to near 0 V, the positive electrode and the negative electrode have almost the same potential due to small polarization. In such cases, the potential range in which the positive electrode has good reversibility (1.8 V or higher relative to lithium metal ($Li/Li^+$)) is not compatible with the potential range in which the negative electrode has good reversibility (0.2 V or lower relative to lithium metal ($Li/Li^+$)). When the battery is deeply discharged, at least one of the positive electrode active material and the negative electrode active material deteriorates, thereby resulting in significant degradation of cycle life characteristics.

Japanese Laid-Open Patent Publication No. Hei 7-335201 proposes mixing a lithium-containing compound that releases lithium ions at potentials not more than 2 V with a carbon material (negative electrode active material), in order to prevent dissolution of a negative electrode current collector during deep-discharge. This proposal is effective for batteries including a copper negative electrode current collector. However, batteries for use as clock back-up power sources usually employ a molded negative electrode mixture (pellet) as the negative electrode and thus do not have a negative electrode current collector.

From the viewpoint of preventing deep-discharge of a specific battery in a set of batteries that are connected in series, Japanese Laid-Open Patent Publication No. 2001-243943 proposes reducing the voltage change rate of each battery to suppress variations in end-of-discharge voltage. However, this proposal relates to a plurality of batteries that are connected in series and requires a specific system for controlling discharge voltage.

When a silicon oxide is used as a negative electrode active material as proposed in Japanese Laid-Open Patent Publication No. 2000-243449, the deep discharge cycle life becomes short. It has been found that repetitive deep discharge cycles cause a sharp increase in the amount of coating film formed on the active material surface.

The reason for the sharp increase in the amount of coating film is probably that deep discharge makes the distribution of electronic resistance in the negative electrode active material uneven, thereby causing the reaction to proceed unevenly. If the reaction proceeds intensively in a certain region, a large amount of coating film is produced and the deterioration of the region proceeds. As a result, the reaction proceeds intensively in another region, so that the coating film formation and the deterioration proceed acceleratedly.

The reason for the creation of uneven distribution of the electronic resistance in the negative electrode active material is that when deeply discharged, the silicon oxide has a significantly increased electronic resistance. In the silicon oxide in a deeply discharged state, the lithium-silicon alloy produced during charge has a reduced lithium content, so that the alloy has an increased resistance.

When a manganese oxide and a silicon oxide are used as a positive electrode active material and a negative electrode active material, respectively, in a battery that is designed such that the negative electrode capacity is larger than the positive electrode capacity, the potential of the positive electrode relative to lithium metal ($Li/Li^+$) in a deeply discharged state is lower than 1.8 V. As a result, the crystal structure of the manganese oxide may undergo an irreversible change.

BRIEF SUMMARY OF THE INVENTION

Therefore, in order to provide a battery with high capacity and excellent deep discharge cycle life (cycle life characteristics in deep discharge cycles), the present invention relates to a non-aqueous electrolyte secondary battery including a positive electrode, a negative electrode, and a non-aqueous electrolyte, wherein the positive electrode includes a positive electrode active material that comprises a lithium-containing manganese oxide, the negative electrode includes a negative electrode active material that comprises silicon and a transition metal element, and when the battery voltage is 0 V, the positive electrode and the negative electrode have a potential of 1.8 V or higher relative to lithium metal ($Li/Li^+$).

The lithium-containing manganese oxide comprises, for example, at least one selected from the group consisting of $Li_{0.55}MnO_2$, $LiMn_2O_4$, $Li_4Mn_5O_{12}$, and $Li_2Mn_4O_9$.

The transition metal element contained in the negative electrode active material comprises, for example, at least one element selected from the group consisting of titanium, nickel, and iron.

In the negative electrode active material, the molar ratio (atomic ratio) between the silicon and the transition metal element is preferably 67:33 to 98:2, and more preferably 74:26 to 95:5.

Part of the manganese contained in the lithium-containing manganese oxide may be replaced with an element Me. The element Me preferably comprises at least one element selected from the group consisting of nickel and iron. The molar ratio of the element Me to the manganese contained in the lithium-containing manganese oxide is preferably $1/3$ or less.

The negative electrode comprises, for example, a molded negative electrode mixture that contains the negative electrode active material. The molded negative electrode mixture preferably has a thickness of 0.05 mm to 2.0 mm. The negative electrode does not have to have a current collector.

The positive electrode comprises, for example, a molded positive electrode mixture that contains the positive electrode active material. The molded positive electrode mixture preferably has a thickness of 0.30 mm to 3.0 mm. The positive electrode does not have to have a current collector.

The present invention can suppress deterioration of the positive and negative electrode active materials and provide a non-aqueous electrolyte secondary battery with high capacity and excellent deep discharge cycle life.

The present invention also relates to a back-up power source having the above non-aqueous electrolyte secondary battery such as a memory back-up power source and a clock buck-up power source.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

As a result of diligent research, the present inventors have found that when an alloy containing silicon and a transition metal element is used as a negative electrode active material, the amount of coating film on the negative electrode active material surface does not significantly increase even on repetition of charge/discharge cycles in which the discharge is performed until the negative electrode potential becomes near 2.0 V relative to lithium metal. This is probably because the intermetallic compound phase of silicon and the transition metal has a low electronic resistance and the electronic resistance of the negative electrode active material is therefore prevented from rising near the end of discharge. For example, a silicon-titanium alloy has a silicon phase (a phase composed simply of Si) and a titanium disilicide ($TiSi_2$) phase with a low electronic resistance, and the powder electronic resistance of the silicon-titanium alloy is $10^{-4}$ to $10^{-7}$ times that of silicon phase only.

The present invention is based on the above-mentioned findings. The present invention relates to a non-aqueous electrolyte secondary battery including a positive electrode, a negative electrode, and a non-aqueous electrolyte. The positive electrode includes a positive electrode active material that comprises a lithium-containing manganese oxide, and the negative electrode includes a negative electrode active material that comprises silicon (silicon element) and a transition metal element. When the battery voltage is 0 V, the positive electrode and the negative electrode have a potential of 1.8 V or higher relative to lithium metal ($Li/Li^+$).

Since the battery is designed such that when the battery voltage is 0 V, the positive electrode and the negative electrode have a potential of 1.8 V or higher relative to lithium metal ($Li/Li^+$), the deterioration of the positive and negative electrode active materials is suppressed. It is therefore possible to obtain a non-aqueous electrolyte secondary battery with high capacity and excellent deep discharge cycle life.

The method of designing a battery such that at the battery voltage of 0 V the positive and negative electrodes have a potential of 1.8 V or higher relative to lithium metal ($Li/Li^+$) is clear to one with ordinal skill in the art.

The lithium-containing manganese oxide, which forms the positive electrode active material, is preferably $Li_{0.55}MnO_2$, $LiMn_2O_4$, $Li_4Mn_5O_{12}$, $Li_2Mn_4O_9$, or the like in view of the capacity density and stability. They may be used singly or in combination of two or more of them. These compositions are compositions before the battery is charged or discharged. When the battery is charged or discharged, the lithium content changes.

The lithium-containing manganese oxide can be prepared, for example, by mixing a lithium source with a manganese source and baking the resultant mixture in an oxygen-containing atmosphere (e.g., in air or oxygen). Exemplary lithium sources include lithium hydroxide, lithium carbonate, and lithium acetate. Exemplary manganese sources include manganese dioxide, manganese carbonate, and manganese acetate.

When the battery is deeply discharged, i.e., when the battery voltage is 0 V, the positive electrode potential is preferably 1.8 V or higher relative to lithium metal, and more preferably 2.0 V or higher. If the positive electrode potential is lower than 1.8 V, the crystal structure of the lithium-containing manganese oxide is damaged, so that the reversibility of reaction decreases.

Part of the manganese contained in the lithium-containing manganese oxide may be replaced with an element Me. Examples of preferable element Me include, for example, nickel and iron. The lithium-containing manganese oxide may contain one kind of element Me or a plurality of kinds of element Me. When the lithium-containing manganese oxide contains one or more kinds of element Me, changes in the valence of manganese on charge/discharge are reduced. As a result, dissolution of the manganese is suppressed, thereby leading to an improvement in deep discharge cycle life.

The molar ratio of the element Me to the manganese contained in the lithium-containing manganese oxide is preferably $1/3$ or less, and more preferably $1/4$ or less. That is, the amount of the manganese site replaced with the element Me is preferably 33.3% or less of the total of the manganese site contained in the lithium-containing manganese oxide, and more preferably 25% or less. If the amount of the manganese site replaced with the element Me exceeds $1/3$ of the total, the capacity of the positive electrode active material lowers, although the detailed reason for this is not yet clear.

The lithium-containing manganese oxide whose Mn is replaced with the element Me can be prepared, for example, by mixing a lithium source, a manganese source, and an element Me source together and baking the resultant mixture in an oxygen-containing atmosphere (e.g., in air or oxygen). An exemplary element Me source is nickel hydroxide.

While the specific surface area of the positive electrode active material is not particularly limited, it is preferably 2 to 100 $m^2/g$. If the specific surface area is less than 2 $m^2/g$, sufficient capacity may not be obtained due to small reaction area. If the specific surface area exceeds 100 $m^2/g$, the battery capacity may also decrease since an increased amount of conductive agent is necessary or the electronic resistance increases.

While the mean particle size (median diameter:$D_{50}$ in volume basis particle size distribution) of the positive electrode active material is not particularly limited, it is preferably 0.1 to 100 μm. If the mean particle size is less than 0.1 μm, sufficient capacity may not be obtained due to small reaction area. If the mean particle size exceeds 100 μm, the battery capacity may also decrease since an increased amount of conductive agent is necessary or the electronic resistance increases.

The negative electrode active material contains silicon and a transition metal element. The transition metal element may be chromium, manganese, iron, cobalt, nickel, copper, molybdenum, silver, titanium, zirconium, hafnium, tungsten, or the like. The negative electrode active material may contain one kind of transition metal element or a plurality of kinds of transition metal elements. A negative electrode active material containing at least one selected from the group consisting of titanium, nickel, and iron (e.g., titanium disilicide:$TiSi_2$) is particularly preferred from the industrial viewpoint, since it has a small electronic resistance and is readily available.

In the negative electrode active material containing silicon and a transition metal element, the molar ratio between the silicon and the transition metal element is preferably 67:33 to 98:2. If the ratio of the silicon is lower than 67 mol % (the ratio of the transition metal element is more than 33 mol %), the content of the active phase with respect to lithium (e.g., silicon phase) in the negative electrode active material decreases, so that the capacity density of the negative electrode active material decreases. If the ratio of the silicon exceeds 98 mol % (the ratio of the transition metal element is less than 2 mol %), the volume expansion rate of such a negative electrode active material upon lithium absorption is almost the same as that of silicon. It is thus difficult to maintain the current-collecting structure in the negative electrode, thereby resulting in a decrease in capacity retention rate in charge/discharge cycles.

When the transition metal element is Ti, the silicon content in the negative electrode active material is desirably 72.4 to 97.7 mol %. When the transition metal element is Ni, the Si content in the negative electrode active material is desirably 69.4 to 97.45 mol %. When the transition metal element is Fe, the Si content in the negative electrode active material is desirably 70 to 97.5 mol %.

Particularly, it is most effective to set the molar ratio between the silicon and the transition metal element to 74:26 to 95:5, in order to obtain both high capacity and excellent capacity retention rate.

The negative electrode potential is not particularly limited when the negative electrode does not contain graphite as an active material or conductive agent. However, when the negative electrode contains graphite, the negative electrode potential is preferably 0.25 V or lower, and more preferably 0.2 V or lower, relative to lithium metal on ordinary discharge, i.e., when the battery voltage is 2.0 V or higher. This is because repetitive charge/discharge cycles with the negative electrode potential being above 0.25 V relative to lithium metal cause the graphite to deteriorate.

When the battery voltage is 0 V, the positive electrode and the negative electrode have the same potential. Therefore, when the battery is deeply discharged, i.e., when the battery voltage is 0 V, the negative electrode potential is preferably 1.8 V or higher, and more preferably 2.0 V or higher, relative to lithium metal.

In terms of obtaining both high capacity and low electronic resistance, it is preferred that the negative electrode active material be an alloy of silicon and a transition metal element and that the alloy contain at least two phases, i.e., a silicon phase and an intermetallic compound phase of silicon and the transition metal element.

The silicon phase may contain small amounts of other elements, such as phosphorus (P), boron (B), hydrogen (H), and transition metal elements. The intermetallic compound phase has a high affinity for the silicon phase. Thus, even when the volume of the alloy expands during charge, the intermetallic compound phase is unlikely to separate from the silicon phase. The intermetallic compound phase has a higher electronic conductivity than the silicon phase as well as a higher hardness. The alloy may have a plurality of intermetallic compound phases.

While the crystallinity of the negative electrode active material is not particularly limited, it is desirably amorphous, microcrystalline, or in a mixed state having amorphous and microcrystalline regions. By "amorphous" is meant that in an X-ray diffraction analysis using CuKα rays, the diffraction image (diffraction pattern) is broad without having clear peaks attributable to crystal faces. By "microcrystalline" is meant that the crystallite (crystal grain) size is 20 nm or less. These amorphous and microcrystalline states can be directly observed with a transmission electron microscope (TEM). The crystallite size can be determined from the half width of a peak in an X-ray diffraction image by using the Scherrer equation. If a plurality of peaks are present, the half width of the most intense peak is determined and the Scherrer equation is applied thereto. If the crystallite size exceeds 20 nm, the mechanical strength of such active material particles may be insufficient when the active material undergoes volume changes during charge/discharge. As a result, the particles may become cracked, thereby resulting in poor current collection and degradation of charge/discharge efficiency and cycle life characteristics.

With respect to the method for preparing a negative electrode active material that is amorphous, microcrystalline, or in a mixed state with amorphous and microcrystalline regions, there is no particular limitation. An exemplary method is mechanical alloying in which silicon and a substance composed of a transition metal element M are mechanically pulverized or mixed together using a ball mill, vibration mill, planetary ball mill, or the like to directly prepare such a negative electrode active material. In terms of efficiency of mechanical alloying, the use of a vibration mill is most preferred.

While the specific surface area of the negative electrode active material is not particularly limited, it is preferably 0.5 to 20 $m^2/g$. If the specific surface area is less than 0.5 $m^2/g$, the area of the negative electrode active material in contact with a non-aqueous electrolyte is small, so that the charge/discharge efficiency may decrease. If the specific surface area exceeds 20 $m^2/g$, the reactivity between the negative electrode active material and the non-aqueous electrolyte becomes excessive, so that the irreversible capacity may increase.

While the mean particle size (median diameter:$D_{50}$ in volume basis particle size distribution) of the negative electrode active material is not particularly limited, it is preferably 0.1 to 20 µm. If the mean particle size is less than 0.1 µm, the negative electrode active material has a large specific surface area, so that the reactivity between the negative electrode active material and the non-aqueous electrolyte becomes excessive, which may result in an increase in the irreversible capacity. If the mean particle size exceeds 20 µm, the negative electrode active material has a small specific surface area, so that the area of the negative electrode active material in contact with the non-aqueous electrolyte decreases, which may result in a decrease in charge/discharge efficiency.

In terms of safety, it is preferred to form a coating film containing a silicon oxide on the surface of the negative electrode active material. Such a coating film is formed, for example, by stirring a negative electrode active material in a sealed container having a stirring means and gradually introducing oxygen therein. In this method, when the sealed container is cooled by a radiator such as a water-cooling jacket, an increase in the temperature of the negative electrode active that is being stirred is suppressed and the time necessary for forming a coating film is shortened. Specifically, a vibration dryer or a kneader equipped with a heat radiating mechanism may be used.

The positive electrode is desirably a molded positive electrode mixture (e.g., coin-shaped pellet or disc). The positive electrode mixture contains a positive electrode active material as an essential component and contains optional components such as a binder and a conductive agent. When the positive electrode mixture is molded, no current collector is necessary, and the capacity of the positive electrode can be heightened. Particularly when the battery size is small as in batteries for use as back-up power sources, the use of a molded positive electrode mixture is advantageous.

With respect to the size of the molded positive electrode mixture, the thickness thereof is preferably 0.30 mm to 3.0 mm in both charged and discharged states. If the thickness of the molded positive electrode mixture is less than 0.30 mm in a battery design in which the potentials of the positive electrode and the negative electrode at a battery voltage of 0 V are 1.8 V or higher relative to lithium metal, the energy density of the positive electrode is smaller than that of the negative electrode. Thus, the thickness of the negative electrode to be disposed so as to face the positive electrode becomes less than the lower limit of 0.05 mm. If the thickness of the molded positive electrode mixture exceeds 3.0 mm, the diffusibility of lithium ions in the positive electrode extremely lowers, so that the charge/discharge efficiency may degrade.

The negative electrode is desirably a molded negative electrode mixture (e.g., coin-shaped pellet or disc). The negative electrode mixture contains a negative electrode active material as an essential component and contains optional components such as a binder and a conductive agent. When the negative electrode mixture is molded, no current collector is necessary, and the capacity of the negative electrode can be heightened. Particularly when the battery size is small as in batteries for use as back-up power sources, the use of a molded negative electrode mixture is advantageous.

With respect to the size of the molded negative electrode mixture, the thickness thereof is preferably 0.05 mm to 2.0 mm in both charged and discharged states. If the thickness of the molded negative electrode mixture is less than 0.05 mm, the strength thereof degrades, so that it is difficult to retain the shape, which may result in deterioration in battery characteristics. If the thickness exceeds 2.0 mm, the diffusibility of lithium ions in the negative electrode extremely lowers, so that the charge/discharge efficiency may degrade.

The thicknesses of the molded positive electrode mixture and the molded negative electrode mixture may be determined, for example, by X-ray CT without the need to disassemble the battery.

Exemplary conductive agents to be contained in the positive or negative electrode mixture include: graphites such as natural graphites (flake graphite, etc.), artificial graphites, and expanded graphite; carbon blacks such as acetylene black, ketjen black, channel black, furnace black, lamp black, and thermal black; fibers such as carbon fibers, and metal fibers. They may be used singly or in combination. Among them, the use of graphites and carbon blacks are preferred in terms of density, stability, prices, etc.

Examples of particularly preferable conductive agents to be contained in the positive electrode mixture include acetylene black and ketjen black, and the preferable amount thereof is 1 to 20 parts by weight per 100 parts by weight of the positive electrode active material.

Examples of particularly preferable conductive agents to be contained in the negative electrode mixture are carbon black and a combination of graphite and carbon black, and the preferable amount thereof is 2 to 40 parts by weight per 100 parts by weight of the negative electrode active material.

Exemplary binders to be contained in the positive or negative electrode mixture include styrene butadiene rubber, polyacrylic acid, polyethylene, polyurethane, polymethyl methacrylate, polyvinylidene fluoride, polytetrafluoroethylene (PTFE), carboxymethyl cellulose, and methyl cellulose. They may be used singly or in combination. Among them, preferable examples include styrene butadiene rubber, which is capable of accommodating volume changes of the active material in a relatively flexible manner, and polyacrylic acid, which can maintain strong adhesion.

A particularly preferable binder to be contained in the positive electrode mixture is polytetrafluoroethylene, and the preferable amount thereof is 1 to 20 parts by weight per 100 parts by weight of the positive electrode active material.

A particularly preferable binder to be contained in the negative electrode mixture is polyacrylic acid, and the preferable amount thereof is 2 to 30 parts by weight per 100 parts by weight of the negative electrode active material.

A preferable non-aqueous electrolyte comprises a non-aqueous solvent and a lithium salt dissolved therein.

Exemplary non-aqueous solvents include: cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; γ-lactones such as γ-butyrolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; aprotic organic solvents such as dimethyl sulfoxide, 1,3-dioxolane, formamide, acetamide, dimethylformamide, dioxolane, acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, N-methylpyrrolidone, butyl diglyme, and methyl tetraglyme. They are preferably used in combination of two or more of them.

Exemplary lithium salts include $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiB_{10}Cl_{10}$, lithium lower aliphatic carboxylate, LiCl, LiBr, LiI, chloroborane lithium, lithium tetraphenylborate, and imides. They may be used singly or in combination of two or more of them. The concentration of a lithium salt dissolved in a non-aqueous solvent is preferably 0.2 to 2.0 mol/L, and more preferably 0.5 to 1.5 mol/L.

The separator interposed between the positive electrode and the negative electrode may be a microporous thin film with high ion permeability, predetermined mechanical strength, and an electron insulating property. Particularly preferred is a microporous thin film that comprises a material such as polypropylene, polyethylene, polyphenylene sulfide, polyethylene terephthalate, polyamide, or polyimide.

The shape of the non-aqueous electrolyte secondary battery of the present invention is not particularly limited and can be, for example, cylindrical, rectangular, or coin-shaped. It should be noted, however, that the present invention is particularly preferable as a coin-type non-aqueous electrolyte secondary battery. A coin-type non-aqueous electrolyte secondary battery has a coin-shaped battery case including a positive electrode can and a negative electrode can that contain a molded positive electrode mixture disc and a molded negative electrode mixture disc, respectively. A separator is interposed between the positive electrode and the negative electrode. The open edge of the positive electrode can and the open edge of the negative electrode can are jointed together with an insulating gasket interposed therebetween, to seal the battery. The sealing of the battery is performed after the positive electrode, negative electrode and separator have been impregnated with a lithium-ion conductive non-aqueous electrolyte.

The present invention is hereinafter described specifically by way of Examples. These Examples, however, are not to be construed as limiting in any way the present invention.

EXAMPLE 1

(i) Preparation of Positive Electrode

Manganese dioxide and lithium hydroxide were mixed together in a molar ratio of 20:11. The resultant mixture was baked at 400° C. in air for 12 hours, to obtain $Li_{0.55}MnO_2$ with a mean particle size of 10 μm and a BET specific surface area of 20 $m^2$/g. $Li_{0.55}MnO_2$ serving as a positive electrode active material, acetylene black as a conductive agent, and polytetrafluoroethylene (PTFE) as a binder were mixed together in a weight ratio of 88:6:6, to form a positive electrode mixture. The PTFE binder used was in the form of an aqueous dispersion. The positive electrode mixture was molded into a coin-shaped pellet with a diameter of 4 mm and a thickness of 1.0 mm. The molded pellet was dried at 250° C. for 12 hours, to prepare a positive electrode.

(ii) Preparation of Negative Electrode

A silicon-titanium alloy was synthesized in the following manner.

Silicon powder and titanium powder were mixed together such that the molar ratio (atomic ratio) between silicon and titanium was 85:15. The resultant mixture of 1.7 kg and 1-inch diameter stainless steel balls of 300 kg were placed into a stainless steel vibration ball mill with an internal volume of 64 L (FV-20 available from Chuo Kakohki Industries, Ltd). After the air inside the mill was replaced with argon gas, the mixture was crushed at an amplitude of 8 mm and 1200 rpm for 60 hours, to obtain a silicon-titanium alloy.

An X-ray diffraction (XRD) analysis of this silicon-titanium alloy showed that the silicon-titanium alloy had at least a silicon phase and a titanium disilicide phase. A calculation of the crystallite size from the peak position of the diffraction image, the half width and the Scherrer equation showed that the silicon phase was amorphous and the titanium disilicide phase had a crystallite size of 15 nm. The weight ratio between the titanium disilicide phase and the silicon phase was 50:50 on the assumption that all the titanium formed titanium disilicide.

This silicon-titanium alloy was collected, while being kept in the argon atmosphere, into a vibration dryer (VU30 available from Chuo Kakohki Industries, Ltd). While the silicon-titanium alloy was being stirred by vibrations, a mixed gas of argon and oxygen was intermittently introduced into the vibration dryer in 1 hour such that the temperature of the alloy would not exceed 100° C. As a result, a coating film containing a silicon oxide was formed on the surfaces of the alloy particles. The alloy particles were then classified such that the maximum particle size was 63 μm, and the classified alloy particles were used as the negative electrode active material.

The silicon-titanium alloy serving as the negative electrode active material, carbon black as a conductive agent, and polyacrylic acid as a binder were mixed together in a weight ratio of 120:10:10, to form a negative electrode mixture. The negative electrode mixture was molded into a pellet with a diameter of 4 mm and a thickness of 0.3 mm. The resultant pellet was dried at 200° C. for 12 hours, to prepare a negative electrode.

(iii) Preparation of Non-aqueous Electrolyte

Propylene carbonate (PC), ethylene carbonate (EC), and 1,2-dimethoxyethane (DME) were mixed together in a volume ratio of 1:1:1, to prepare a non-aqueous solvent mixture. $LiN(CF_3SO_2)_2$ was dissolved as a lithium salt in the solvent mixture at a concentration of 1 mol/liter, to prepare a non-aqueous electrolyte.

(iv) Production of Test Battery

Figure 1:
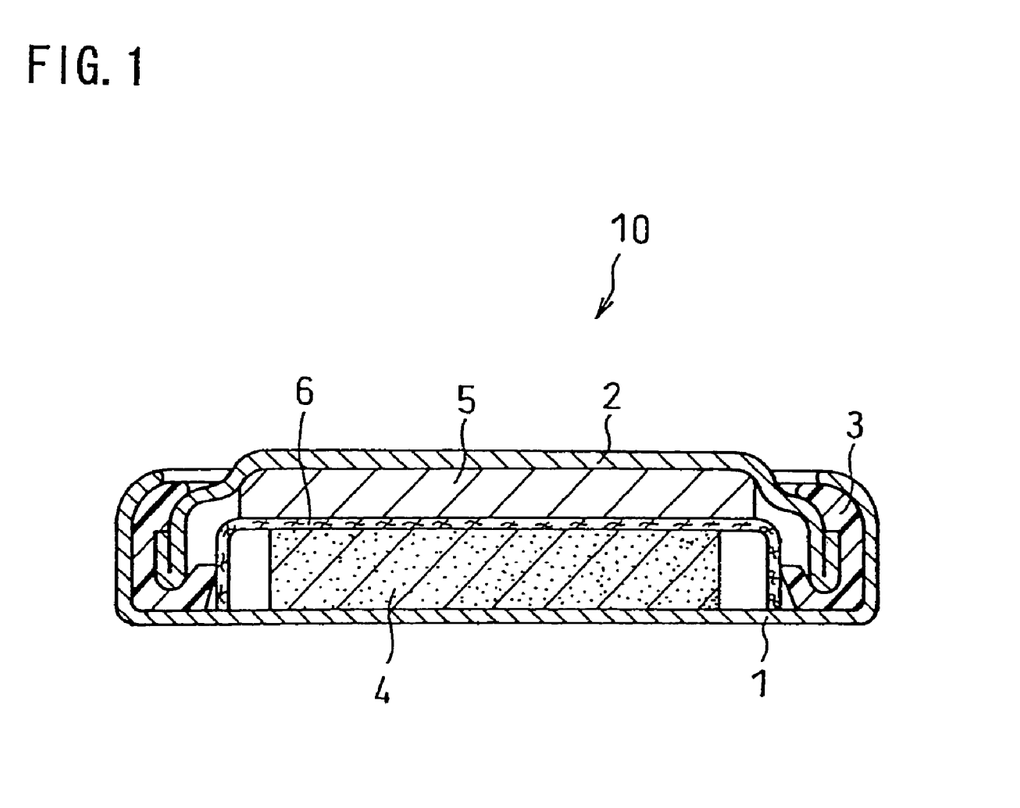
FIG. 1 is a longitudinal sectional view of a coin battery according to an Example of the present invention.

A coin battery with a diameter of 6.8 mm and a thickness of 2.1 mm was produced as illustrated in FIG. 1. A positive electrode can 1 serves as the positive electrode terminal and is made of stainless steel having excellent resistance to corrosion. A negative electrode can 2 serves as the negative electrode terminal and is made of stainless steel, which is the same material as that of the positive electrode can 1. A gasket 3 is made of polypropylene and insulates the positive electrode can 1 from the negative electrode can 2. Pitch is applied between the positive electrode can 1 and the gasket 3 and between the negative electrode can 2 and the gasket 3.

The negative electrode active material (silicon-titanium alloy) needs to be alloyed with lithium. Thus, when a battery was assembled, lithium foil was attached under pressure to the surface of a negative electrode 5 (separator side). After the battery assembly, the lithium foil was allowed to be electrochemically absorbed into the negative electrode in the presence of a non-aqueous electrolyte, so that a lithium alloy was produced in the negative electrode 5. A separator 6 made of polypropylene non-woven fabric was disposed between a positive electrode 4 and the negative electrode 5.

In order for the positive electrode and the negative electrode to have a potential of 2.0 V relative to lithium metal when the battery is deeply discharged (when the battery is discharged to a voltage of 0 V), the positive electrode was adjusted to 41.3 mg and the negative electrode was adjusted to 4.6 mg. A non-aqueous electrolyte of 15 μL was charged into the battery. In consideration of the irreversible capacity, the amount of lithium foil attached to the negative electrode 5 was adjusted to 4.0 μL such that the initial discharge capacity was 7.0 mAh on deep discharge. The resultant battery was designated as A1.

EXAMPLE 2

A battery A2 was produced in the same manner as in Example 1, except that the positive electrode was adjusted to 39.1 mg such that the positive electrode and the negative electrode had a potential of 1.8 V relative to lithium metal on deep discharge (when the battery was discharged to a voltage of 0 V), and that the amount of lithium foil was changed such that the initial discharge capacity on deep discharge was 7.0 mAh.

COMPARATIVE EXAMPLE 1

A battery A3 was produced in the same manner as in Example 1, except that the positive electrode was adjusted to 35.5 mg such that the positive electrode and the negative electrode had a potential of 1.5 V relative to lithium metal on deep discharge (when the battery was discharged to a voltage of 0 V), and that the amount of lithium foil was changed such that the initial discharge capacity on deep discharge was 7.0 mAh.

EXAMPLE 3

A silicon-titanium alloy was synthesized in the same manner as in Example 1, except that silicon powder and titanium powder were mixed together in a molar ratio (atomic ratio) between silicon and titanium of 67:33. An XRD analysis showed that the silicon-titanium alloy contained at least a silicon phase and a titanium disilicide phase. The silicon phase was amorphous, and the titanium disilicide phase had a crystallite size of 15 nm. The weight ratio between the titanium disilicide phase and the silicon phase was 99:1 on the assumption that all the titanium formed titanium disilicide.

A negative electrode was produced in the same manner as in Example 1, except that the silicon-titanium alloy serving as the negative electrode active material, carbon black as the conductive agent, and polyacrylic acid as the binder were mixed together in a weight ratio of 114:20:10. Using this negative electrode, a battery A4 was produced in the same manner as in Example 2 except that the amount of lithium foil was changed such that the initial discharge capacity was 4.5 mAh on deep discharge (when the battery was discharged to a voltage of 0 V).

EXAMPLE 4

A silicon-titanium alloy was synthesized in the same manner as in Example 1, except that silicon powder and titanium powder were mixed together in a molar ratio between silicon and titanium of 74:26. An XRD analysis showed that the silicon-titanium alloy contained at least a silicon phase and a titanium disilicide phase. The silicon phase was amorphous, and the titanium disilicide phase had a crystallite size of 15 nm. The weight ratio between the titanium disilicide phase and the silicon phase was 82:18 on the assumption that all the titanium formed titanium disilicide.

A negative electrode was produced in the same manner as in Example 1, except that the silicon-titanium alloy serving as the negative electrode active material, carbon black as the conductive agent, and polyacrylic acid as the binder were mixed together in a weight ratio of 100:20:10. A battery A5 was produced in the same manner as in Example 2 except for the use of this negative electrode.

EXAMPLE 5

A silicon-titanium alloy was synthesized in the same manner as in Example 1, except that silicon powder and titanium powder were mixed together in a molar ratio between silicon and titanium of 78:22. An XRD analysis showed that the silicon-titanium alloy contained at least a silicon phase and a titanium disilicide phase. The silicon phase was amorphous, and the titanium disilicide phase had a crystallite size of 15 nm. The weight ratio between the titanium disilicide phase and the silicon phase was 70:30 on the assumption that all the titanium formed titanium disilicide.

A negative electrode was produced in the same manner as in Example 1, except that the silicon-titanium alloy serving as the negative electrode active material, carbon black as the conductive agent, and polyacrylic acid as the binder were mixed together in a weight ratio of 94:20:10. A battery A6 was produced in the same manner as in Example 2 except for the use of this negative electrode.

EXAMPLE 6

A silicon-titanium alloy was synthesized in the same manner as in Example 1, except that silicon powder and titanium powder were mixed together in a molar ratio between silicon and titanium of 90:10. An XRD analysis showed that the silicon-titanium alloy contained at least a silicon phase and a titanium disilicide phase. The silicon phase was amorphous, and the titanium disilicide phase had a crystallite size of 15 nm. The weight ratio between the titanium disilicide phase and the silicon phase was 35:65 on the assumption that all the titanium formed titanium disilicide.

A negative electrode was produced in the same manner as in Example 1, except that the silicon-titanium alloy serving as the negative electrode active material, carbon black as the conductive agent, and polyacrylic acid as the binder were mixed together in a weight ratio of 77:20:10. A battery A7 was produced in the same manner as in Example 2 except for the use of this negative electrode.

EXAMPLE 7

A silicon-titanium alloy was synthesized in the same manner as in Example 1, except that silicon powder and titanium powder were mixed together in a molar ratio between silicon and titanium of 95:5. An XRD analysis showed that the silicon-titanium alloy contained at least a silicon phase and a titanium disilicide phase. The silicon phase had a crystallite size of 9 nm, and the titanium disilicide phase had a crystallite size of 11 nm. The weight ratio between the titanium disilicide phase and the silicon phase was 18:82 on the assumption that all the titanium formed titanium disilicide.

A negative electrode was produced in the same manner as in Example 1, except that the silicon-titanium alloy serving as the negative electrode active material, carbon black as the conductive agent, and polyacrylic acid as the binder were mixed together in a weight ratio of 71:20:10. A battery A8 was produced in the same manner as in Example 2 except for the use of this negative electrode.

EXAMPLE 8

A silicon-titanium alloy was synthesized in the same manner as in Example 1, except that silicon powder and titanium powder were mixed together in a molar ratio between silicon and titanium of 98:2. An XRD analysis showed that the silicon-titanium alloy contained at least a silicon phase and a titanium disilicide phase. The silicon phase had a crystallite size of 9 nm, and the titanium disilicide phase had a crystallite size of 11 nm. The weight ratio between the titanium disilicide phase and the silicon phase was 7:93 on the assumption that all the titanium formed titanium disilicide.

A negative electrode was produced in the same manner as in Example 1, except that the silicon-titanium alloy serving as the negative electrode active material, carbon black as the conductive agent, and polyacrylic acid as the binder were mixed together in a weight ratio of 67:20:10. A battery A9 was produced in the same manner as in Example 2 except for the use of this negative electrode.

EXAMPLE 9

A silicon-titanium alloy was synthesized in the same manner as in Example 1, except that silicon powder and titanium powder were mixed together in a molar ratio between silicon and titanium of 99:1. An XRD analysis showed that the silicon-titanium alloy contained at least a silicon phase and a titanium disilicide phase. The silicon phase had a crystallite size of 9 nm, and the titanium disilicide phase had a crystallite size of 11 nm. The weight ratio between the titanium disilicide phase and the silicon phase was 4:96 on the assumption that all the titanium formed titanium disilicide.

A negative electrode was produced in the same manner as in Example 1, except that the silicon-titanium alloy serving as the negative electrode active material, carbon black as the conductive agent, and polyacrylic acid as the binder were mixed together in a weight ratio of 66:20:10. A battery A10 was produced in the same manner as in Example 2 except for the use of this negative electrode.

EXAMPLE 10

Nickel powder was used instead of titanium powder.

A silicon-nickel alloy was synthesized in the same manner as in Example 1, except that silicon powder and nickel powder were mixed together in a molar ratio between silicon and nickel of 84.4:15.6. An XRD analysis showed that the silicon-nickel alloy contained at least a silicon phase and a nickel disilicide phase. However, separation of the silicon phase and the nickel disilicide phase was not possible since their peak positions overlapped each other. This alloy had a crystallite size of 12 nm. The weight ratio between the nickel disilicide phase and the silicon phase was 54:46 on the assumption that all the nickel formed nickel disilicide.

A negative electrode was produced in the same manner as in Example 1, except that the silicon-nickel alloy serving as the negative electrode active material, carbon black as the conductive agent, and polyacrylic acid as the binder were mixed together in a weight ratio of 91:20:10. A battery B1 was produced in the same manner as in Example 2 except for the use of this negative electrode.

EXAMPLE 11

Iron powder was used instead of titanium powder.

A silicon-iron alloy was synthesized in the same manner as in Example 1, except that silicon powder and iron powder were mixed together in a molar ratio between silicon and iron of 84:16. An XRD analysis showed that the silicon-iron alloy contained at least a silicon phase and an iron disilicide phase. The silicon phase was amorphous, and the iron disilicide phase had a crystallite size of 15 nm. The weight ratio between the iron disilicide phase and the silicon phase was 55:45 on the assumption that all the iron formed iron disilicide.

A negative electrode was produced in the same manner as in Example 1, except that the silicon-iron alloy serving as the negative electrode active material, carbon black as the conductive agent, and polyacrylic acid as the binder were mixed together in a weight ratio of 93:20:10. A battery C1 was produced in the same manner as in Example 2 except for the use of this negative electrode.

COMPARATIVE EXAMPLE 2

Graphite powder was used as the negative electrode active material. A negative electrode was prepared in the same manner as in Example 1 except that graphite was mixed with carboxymethyl cellulose and styrene butadiene rubber serving as binders in a weight ratio of 100:1:1. Using this negative electrode, a battery D1 was produced in the same manner as in Example 1 except that the amount of lithium foil was changed such that the initial discharge capacity was 4.5 mAh on deep discharge (when the battery was discharged to a voltage of 0 V).

COMPARATIVE EXAMPLE 3

A negative electrode was prepared in the same manner as in Comparative Example 2. Using this negative electrode, a battery D2 was produced in the same manner as in Example 2 except that the amount of lithium foil was changed such that the initial discharge capacity was 4.5 mAh on deep discharge (when the battery was discharged to a voltage of 0 V).

COMPARATIVE EXAMPLE 4

A negative electrode was prepared in the same manner as in Comparative Example 2. Using this negative electrode, a battery D3 was produced in the same manner as in Comparative Example 1 except that the amount of lithium foil was changed such that the initial discharge capacity was 4.5 mAh on deep discharge (when the battery was discharged to a voltage of 0 V).

COMPARATIVE EXAMPLE 5

Silicon powder was used singly as the negative electrode active material. Only silicon powder was processed in a vibration ball mill in the same manner as in Example 1, to make the crystallite size to 12 nm. A negative electrode was prepared in the same manner as in Example 1 except for the use of this silicon powder. A battery E1 was produced in the same manner as in Example 1 except for the use of this negative electrode.

COMPARATIVE EXAMPLE 6

A negative electrode was prepared in the same manner as in Comparative Example 5. A battery E2 was produced in the same manner as in Example 2 except for the use of this negative electrode.

COMPARATIVE EXAMPLE 7

A negative electrode was prepared in the same manner as in Comparative Example 5. A battery E3 was produced in the same manner as in Comparative Example 1 except for the use of this negative electrode.

COMPARATIVE EXAMPLE 8

SiO powder was used singly as the negative electrode active material. Only SiO powder was processed in a vibration ball mill in the same manner as in Example 1, to make the crystallite size to 12 nm. A negative electrode was prepared in the same manner as in Example 1 except for the use of this SiO powder. A battery F1 was produced in the same manner as in Example 1 except for the use of this negative electrode.

COMPARATIVE EXAMPLE 9

A negative electrode was prepared in the same manner as in Comparative Example 8. A battery F2 was produced in the same manner as in Example 2 except for the use of this negative electrode.

COMPARATIVE EXAMPLE 10

A negative electrode was prepared in the same manner as in Comparative Example 8. A battery F3 was produced in the same manner as in Comparative Example 1 except for the use of this negative electrode.

EXAMPLE 12

Manganese dioxide and lithium hydroxide were mixed together in a molar ratio of 2:1. The resultant mixture was baked at 500° C. in air for 24 hours, to obtain $LiMn_2O_4$ with a mean particle size of 10 μm and a BET specific surface area of 16 $m^2/g$. A positive electrode was prepared in the same manner as in Example 1 except for the use of this $LiMn_2O_4$ as the positive electrode active material. A battery A11 was produced in the same manner as in Example 2 except for the use of this positive electrode.

EXAMPLE 13

A positive electrode was prepared in the same manner as in Example 12. A battery B2 was produced in the same manner as in Example 10 except for the use of this positive electrode.

EXAMPLE 14

A positive electrode was prepared in the same manner as in Example 12. A battery C2 was produced in the same manner as in Example 11 except for the use of this positive electrode.

COMPARATIVE EXAMPLE 11

A negative electrode was prepared in the same manner as in Comparative Example 2. Using this negative electrode, a battery D4 was produced in the same manner as in Example 12 except that the amount of lithium foil was changed such that the initial discharge capacity was 4.5 mAh on deep discharge (when the battery was discharged to a voltage of 0 V).

COMPARATIVE EXAMPLE 12

A negative electrode was prepared in the same manner as in Comparative Example 5. A battery E4 was produced in the same manner as in Example 12 except for the use of this negative electrode.

COMPARATIVE EXAMPLE 13

A negative electrode was prepared in the same manner as in Comparative Example 8. A battery F4 was produced in the same manner as in Example 12 except for the use of this negative electrode.

EXAMPLE 15

Manganese dioxide and lithium hydroxide were mixed together in a molar ratio of 1:0.8. The resultant mixture was baked at 500° C. in air for 6 hours, to obtain $Li_4Mn_5O_{12}$ with a mean particle size of 10 μm and a BET specific surface area of 31 $m^2/g$. A positive electrode was prepared in the same manner as in Example 1 except for the use of this $Li_4Mn_5O_{12}$ as the positive electrode active material. A battery A12 was produced in the same manner as in Example 2 except for the use of this positive electrode.

EXAMPLE 16

A positive electrode was prepared in the same manner as in Example 15. A battery B3 was produced in the same manner as in Example 10 except for the use of this positive electrode.

EXAMPLE 17

A positive electrode was prepared in the same manner as in Example 15. A battery C3 was produced in the same manner as in Example 11 except for the use of this positive electrode.

COMPARATIVE EXAMPLE 14

A negative electrode was prepared in the same manner as in Comparative Example 2. Using this negative electrode, a battery D5 was produced in the same manner as in Example 15 except that the amount of lithium foil was changed such that the initial discharge capacity was 4.5 mAh on deep discharge (when the battery was discharged to a voltage of 0 V).

COMPARATIVE EXAMPLE 15

A negative electrode was prepared in the same manner as in Comparative Example 5. A battery E5 was produced in the same manner as in Example 15 except for the use of this negative electrode.

COMPARATIVE EXAMPLE 16

A negative electrode was prepared in the same manner as in Comparative Example 8. A battery F5 was produced in the same manner as in Example 15 except for the use of this negative electrode.

EXAMPLE 18

$MnCO_3$ and lithium hydroxide were mixed together in molar ratio of 2:1. The resultant mixture was baked at 345° C. in air for 32 hours, to obtain $Li_2Mn_4O_9$ with a mean particle size of 10 μm and a BET specific surface area of 43 $m^2/g$. A positive electrode was prepared in the same manner as in Example 1 except for the use of this $Li_2Mn_4O_9$ as the positive electrode active material. A battery A13 was produced in the same manner as in Example 2 except for the use of this positive electrode.

EXAMPLE 19

A positive electrode was prepared in the same manner as in Example 18. A battery B4 was produced in the same manner as in Example 10 except for the use of this positive electrode.

EXAMPLE 20

A positive electrode was prepared in the same manner as in Example 18. A battery C4 was produced in the same manner as in Example 11 except for the use of this positive electrode.

COMPARATIVE EXAMPLE 17

A negative electrode was prepared in the same manner as in Comparative Example 2. Using this negative electrode, a battery D6 was produced in the same manner as in Example 18 except that the amount of lithium foil was changed such that the initial discharge capacity was 4.5 mAh on deep discharge (when the battery was discharged to a voltage of 0 V).

COMPARATIVE EXAMPLE 18

A negative electrode was prepared in the same manner as in Comparative Example 5. A battery E6 was produced in the same manner as in Example 18 except for the use of this negative electrode.

COMPARATIVE EXAMPLE 19

A negative electrode was prepared in the same manner as in Comparative Example 8. A battery F6 was produced in the same manner as in Example 18 except for the use of this negative electrode.

EXAMPLE 21

$MnCO_3$, nickel hydroxide, and lithium hydroxide were mixed together in a molar ratio of 15:5:11. The resultant mixture was baked at 345° C. in air for 32 hours, to obtain $Li_{0.55}Mn_{0.75}Ni_{0.25}O_2$ with a mean particle size of 10 μm and a BET specific surface area of 32 m²/g. A positive electrode was prepared in the same manner as in Example 1 except for the use of this $Li_{0.55}Mn_{0.75}Ni_{0.25}O_2$ as the positive electrode active material. A battery A14 was produced in the same manner as in Example 2 except for the use of this positive electrode.

EXAMPLE 22

A positive electrode was prepared in the same manner as in Example 21. A battery B5 was produced in the same manner as in Example 10 except for the use of this positive electrode.

EXAMPLE 23

A positive electrode was prepared in the same manner as in Example 21. A battery C5 was produced in the same manner as in Example 11 except for the use of this positive electrode.

COMPARATIVE EXAMPLE 20

A negative electrode was prepared in the same manner as in Comparative Example 2. Using this negative electrode, a battery D7 was produced in the same manner as in Example 21 except that the amount of lithium foil was changed such that the initial discharge capacity was 4.5 mAh on deep discharge (when the battery was discharged to a voltage of 0 V).

COMPARATIVE EXAMPLE 21

A negative electrode was prepared in the same manner as in Comparative Example 5. A battery E7 was produced in the same manner as in Example 21 except for the use of this negative electrode.

COMPARATIVE EXAMPLE 22

A negative electrode was prepared in the same manner as in Comparative Example 8. A battery F7 was produced in the same manner as in Example 21 except for the use of this negative electrode.

EXAMPLE 24

$MnCO_3$, nickel hydroxide, and lithium hydroxide were mixed together in a molar ratio of 3:1:2. The resultant mixture was baked at 345% in air for 32 hours, to obtain $LiMn_{1.5}Ni_{0.5}O_4$ with a mean particle size of 10 μm and a BET specific surface area of 38 m²/g. A positive electrode was prepared in the same manner as in Example 1 except for the use of this $LiMn_{1.5}Ni_{0.5}O_4$ as the positive electrode active material. A battery A15 was produced in the same manner as in Example 2 except for the use of this positive electrode.

EXAMPLE 25

A positive electrode was prepared in the same manner as in Example 24. A battery B6 was produced in the same manner as in Example 10 except for the use of this positive electrode.

EXAMPLE 26

A positive electrode was prepared in the same manner as in Example 24. A battery C6 was produced in the same manner as in Example 11 except for the use of this positive electrode.

COMPARATIVE EXAMPLE 23

A negative electrode was prepared in the same manner as in Comparative Example 2. Using this negative electrode, a battery D8 was produced in the same manner as in Example 24 except that the amount of lithium foil was changed such that the initial discharge capacity was 4.5 mAh on deep discharge (when the battery was discharged to a voltage of 0 V).

COMPARATIVE EXAMPLE 24

A negative electrode was prepared in the same manner as in Comparative Example 5. A battery E8 was produced in the same manner as in Example 24 except for the use of this negative electrode.

COMPARATIVE EXAMPLE 25

A negative electrode was prepared in the same manner as in Comparative Example 8. A battery F8 was produced in the same manner as in Example 24 except for the use of this negative electrode.

EXAMPLE 27

$MnCO_3$, nickel hydroxide, and lithium hydroxide were mixed together in a molar ratio of 3:1:3.2. The resultant mixture was baked at 345° C. in air for 32 hours, to obtain $Li_4Mn_{3.75}Ni_{1.25}O_{12}$ with a mean particle size of 10 μm and a BET specific surface area of 36 m²/g. A positive electrode was prepared in the same manner as in Example 1 except for the use of this $Li_4Mn_{3.75}Ni_{1.25}O_{12}$ as the positive electrode active material. A battery A16 was produced in the same manner as in Example 2 except for the use of this positive electrode.

EXAMPLE 28

A positive electrode was prepared in the same manner as in Example 27. A battery B7 was produced in the same manner as in Example 10 except for the use of this positive electrode.

EXAMPLE 29

A positive electrode was prepared in the same manner as in Example 27. A battery C7 was produced in the same manner as in Example 11 except for the use of this positive electrode.

COMPARATIVE EXAMPLE 26

A negative electrode was prepared in the same manner as in Comparative Example 2. Using this negative electrode, a battery D9 was produced in the same manner as in Example 27 except that the amount of lithium foil was changed such that the initial discharge capacity was 4.5 mAh on deep discharge (when the battery was discharged to a voltage of 0 V).

COMPARATIVE EXAMPLE 27

A negative electrode was prepared in the same manner as in Comparative Example 5. A battery E9 was produced in the same manner as in Example 27 except for the use of this negative electrode.

COMPARATIVE EXAMPLE 28

A negative electrode was prepared in the same manner as in Comparative Example 8. A battery F9 was produced in the same manner as in Example 27 except for the use of this negative electrode.

EXAMPLE 30

$MnCO_3$, nickel hydroxide, and lithium hydroxide were mixed together in a molar ratio of 3:1:2. The resultant mixture was baked at 345° C. in air for 32 hours, to obtain $Li_2Mn_3NiO_9$ with a mean particle size of 10 μm and a BET specific surface area of 25 m²/g. A positive electrode was prepared in the same manner as in Example 1 except for the use of this $Li_2Mn_3NiO_9$ as the positive electrode active material. A battery A17 was produced in the same manner as in Example 2 except for the use of this positive electrode.

EXAMPLE 31

A positive electrode was prepared in the same manner as in Example 30. A battery B8 was produced in the same manner as in Example 10 except for the use of this positive electrode.

EXAMPLE 32

A positive electrode was prepared in the same manner as in Example 30. A battery C8 was produced in the same manner as in Example 11 except for the use of this positive electrode.

COMPARATIVE EXAMPLE 29

A negative electrode was prepared in the same manner as in Comparative Example 2. Using this negative electrode, a battery D10 was produced in the same manner as in Example 30 except that the amount of lithium foil was changed such that the initial discharge capacity was 4.5 mAh on deep discharge (when the battery was discharged to a voltage of 0 V).

COMPARATIVE EXAMPLE 30

A negative electrode was prepared in the same manner as in Comparative Example 5. A battery E10 was produced in the same manner as in Example 30 except for the use of this negative electrode.

COMPARATIVE EXAMPLE 31

A negative electrode was prepared in the same manner as in Comparative Example 8. A battery F10 was produced in the same manner as in Example 30 except for the use of this negative electrode.

Tables 1 to 3 summarize the features of the respective batteries as described above.

TABLE 1

| | Battery No. | Negative electrode | Positive electrode | Initial battery capacity (mAh) | |
|---|---|---|---|---|---|
| | | | | 2.0 V cut | 0 V cut |
| Example 1 | A1 | Ti:Si = 15:85 | $Li_{0.55}MnO_2$ | 5.7 | 7.0 |
| Example 2 | A2 | | | 5.7 | 7.0 |
| Comp. example 1 | A3 | | | 5.0 | 7.0 |
| Example 3 | A4 | Ti:Si = 33:67 | | 3.7 | 4.5 |
| Example 4 | A5 | Ti:Si = 26:74 | | 5.7 | 7.0 |
| Example 5 | A6 | Ti:Si = 22:78 | | 5.7 | 7.0 |
| Example 6 | A7 | Ti:Si = 10:90 | | 5.7 | 7.0 |
| Example 7 | A8 | Ti:Si = 5:95 | | 5.7 | 7.0 |
| Example 8 | A9 | Ti:Si = 2:98 | | 5.7 | 7.0 |
| Example 9 | A10 | Ti:Si = 1:99 | | 5.7 | 7.0 |
| Example 10 | B1 | Ni:Si = 15.6:84.4 | | 5.7 | 7.0 |
| Example 11 | C1 | Fe:Si = 16.0:84.0 | | 5.7 | 7.0 |
| Comp. example 2 | D1 | Graphite | | 4.2 | 4.5 |
| Comp. example 3 | D2 | | | 4.2 | 4.5 |
| Comp. example 4 | D3 | | | 4.2 | 4.5 |
| Comp. example 5 | E1 | Si | | 5.7 | 7.0 |
| Comp. example 6 | E2 | | | 5.7 | 7.0 |
| Comp. example 7 | E3 | | | 5.0 | 7.0 |

TABLE 1-continued

|  | Battery No. | Negative electrode | Positive electrode | Initial battery capacity (mAh) | |
| --- | --- | --- | --- | --- | --- |
|  |  |  |  | 2.0 V cut | 0 V cut |
| Comp. example 8 | F1 | SiO |  | 5.2 | 7.0 |
| Comp. example 9 | F2 |  |  | 5.2 | 7.0 |
| Comp. example 10 | F3 |  |  | 4.8 | 7.0 |

TABLE 2

|  | Battery No. | Negative electrode | Positive electrode | Initial battery capacity (mAh) | |
| --- | --- | --- | --- | --- | --- |
|  |  |  |  | 2.0 V cut | 0 V cut |
| Comp. example 11 | D4 | Graphite | $LiMn_2O_4$ | 4.0 | 4.5 |
| Comp. example 12 | E4 | Si |  | 6.1 | 7.0 |
| Comp. example 13 | F4 | SiO |  | 5.4 | 7.0 |
| Example 12 | A11 | Ti:Si = 15:85 |  | 6.1 | 7.0 |
| Example 13 | B2 | Ni:Si = 15.6:84.4 |  | 6.1 | 7.0 |
| Example 14 | C2 | Fe:Si = 16.0:84.0 |  | 6.1 | 7.0 |
| Comp. example 14 | D5 | Graphite | $Li_4Mn_5O_{12}$ | 3.9 | 4.5 |
| Comp. example 15 | E5 | Si |  | 5.9 | 7.0 |
| Comp. example 16 | F5 | SiO |  | 5.2 | 7.0 |
| Example 15 | A12 | Ti:Si = 15:85 |  | 5.9 | 7.0 |
| Example 16 | B3 | Ni:Si = 15.6:84.4 |  | 5.9 | 7.0 |
| Example 17 | C3 | Fe:Si = 16.0:84.0 |  | 5.9 | 7.0 |
| Comp. example 17 | D6 | Graphite | $Li_2Mn_4O_9$ | 3.9 | 4.5 |
| Comp. example 18 | E6 | Si |  | 5.9 | 7.0 |
| Comp. example 19 | F6 | SiO |  | 5.2 | 7.0 |
| Example 18 | A13 | Ti:Si = 15:85 |  | 5.9 | 7.0 |
| Example 19 | B4 | Ni:Si = 15.6:84.4 |  | 5.9 | 7.0 |
| Example 20 | C4 | Fe:Si = 16.0:84.0 |  | 5.9 | 7.0 |

TABLE 3

|  | Battery No. | Negative electrode | Positive electrode | Initial battery capacity (mAh) | |
| --- | --- | --- | --- | --- | --- |
|  |  |  |  | 2.0 V cut | 0 V cut |
| Comp. example 20 | D7 | Graphite | $Li_{0.55}Mn_{0.75}Ni_{0.25}O_2$ | 4.4 | 4.5 |
| Comp. example 21 | E7 | Si |  | 5.9 | 7.0 |
| Comp. example 22 | F7 | SiO |  | 5.4 | 7.0 |
| Example 21 | A14 | Ti:Si = 15:85 |  | 5.9 | 7.0 |
| Example 22 | B5 | Ni:Si = 15.6:84.4 |  | 5.9 | 7.0 |
| Example 23 | C5 | Fe:Si = 16.0:84.0 |  | 5.9 | 7.0 |
| Comp. example 23 | D8 | Graphite | $LiMn_{1.5}Ni_{0.5}O_4$ | 4.2 | 4.5 |
| Comp. example 24 | E8 | Si |  | 6.3 | 7.0 |
| Comp. example 25 | F8 | SiO |  | 5.5 | 7.0 |
| Example 24 | A15 | Ti:Si = 15:85 |  | 6.3 | 7.0 |
| Example 25 | B6 | Ni:Si = 15.6:84.4 |  | 6.3 | 7.0 |
| Example 26 | C6 | Fe:Si = 16.0:84.0 |  | 6.3 | 7.0 |
| Comp. example 26 | D9 | Graphite | $Li_4Mn_{3.75}Ni_{1.25}O_{12}$ | 4.4 | 4.5 |
| Comp. example 27 | E9 | Si |  | 5.9 | 7.0 |
| Comp. example 28 | F9 | SiO |  | 5.4 | 7.0 |
| Example 27 | A16 | Ti:Si = 15:85 |  | 5.9 | 7.0 |
| Example 28 | B7 | Ni:Si = 15.6:84.4 |  | 5.9 | 7.0 |
| Example 29 | C7 | Fe:Si = 16.0:84.0 |  | 5.9 | 7.0 |
| Comp. example 29 | D10 | Graphite | $Li_2Mn_3NiO_9$ | 4.4 | 4.5 |
| Comp. example 30 | E10 | Si |  | 5.9 | 7.0 |
| Comp. example 31 | F10 | SiO |  | 5.4 | 7.0 |
| Example 30 | A17 | Ti:Si = 15:85 |  | 5.9 | 7.0 |
| Example 31 | B8 | Ni:Si = 15.6:84.4 |  | 5.9 | 7.0 |
| Example 32 | C8 | Fe:Si = 16.0:84.0 |  | 5.9 | 7.0 |

The respective batteries were evaluated for their capacity retention rate in the following manner.

In a 20° C. constant temperature room, the batteries were charged and discharged for 50 cycles at a constant current of 0.05 C (1 C is a 1 hour-rate current). In these charge/discharge cycles, the battery voltage range was 3.0 to 2.0 V in Condition 1 and was 3.0 to 0.0 V in Condition 2.

In Condition 1 (voltage range: 3.0 to 2.0 V), the percentage of the discharge capacity at the 50th cycle relative to the discharge capacity at the 2nd cycle was obtained as the capacity retention rate. Also, when the battery voltage was 2.0 V, the positive electrode potential and the negative electrode potential were measured.

In Condition 2 (voltage range: 3.0 to 0.0 V), the percentage of the discharge capacity at the 50th cycle relative to the discharge capacity at the 2nd cycle was obtained as the capacity retention rate. Also, when the battery voltage was 0.0 V, the positive electrode potential and the negative electrode potential were measured.

Tables 4 to 6 show the results.

TABLE 4

|  | Negative electrode potential (V) | | Positive electrode potential (V) | | 50 cycle capacity retention rate (%) | |
| --- | --- | --- | --- | --- | --- | --- |
|  | 2.0 V cut | 0 V cut | 2.0 V cut | 0 V cut | 2.0 V cut | 0 V cut |
| Example 1 | 0.6 | 2.0 | 2.6 | 2.0 | 92 | 87 |
| Example 2 | 0.6 | 1.8 | 2.6 | 1.8 | 91 | 86 |
| Comp. example 1 | 0.6 | 1.5 | 2.6 | 1.5 | 90 | 74 |
| Example 3 | 0.6 | 1.8 | 2.6 | 1.8 | 93 | 88 |
| Example 4 | 0.6 | 1.8 | 2.6 | 1.8 | 92 | 87 |
| Example 5 | 0.6 | 1.8 | 2.6 | 1.8 | 91 | 86 |
| Example 6 | 0.6 | 1.8 | 2.6 | 1.8 | 90 | 85 |
| Example 7 | 0.6 | 1.8 | 2.6 | 1.8 | 89 | 84 |
| Example 8 | 0.6 | 1.8 | 2.6 | 1.8 | 87 | 82 |
| Example 9 | 0.6 | 1.8 | 2.6 | 1.8 | 81 | 73 |
| Example 10 | 0.6 | 1.8 | 2.6 | 1.8 | 90 | 85 |
| Example 11 | 0.6 | 1.8 | 2.6 | 1.8 | 89 | 84 |
| Comp. example 2 | 0.25 | 2.0 | 2.25 | 2.0 | 88 | 65 |
| Comp. example 3 | 0.25 | 1.8 | 2.25 | 1.8 | 86 | 60 |
| Comp. example 4 | 0.25 | 1.5 | 2.25 | 1.5 | 84 | 30 |
| Comp. example 5 | 0.6 | 2.0 | 2.6 | 2.0 | 75 | 62 |
| Comp. example 6 | 0.6 | 1.8 | 2.6 | 1.8 | 72 | 54 |
| Comp. example 7 | 0.6 | 1.5 | 2.6 | 1.5 | 68 | 43 |
| Comp. example 8 | 0.7 | 2.0 | 2.7 | 2.0 | 86 | 68 |
| Comp. example 9 | 0.7 | 1.8 | 2.7 | 1.8 | 83 | 72 |
| Comp. example 10 | 0.7 | 1.5 | 2.7 | 1.5 | 80 | 48 |

TABLE 5

|  | Negative electrode potential (V) | | Positive electrode potential (V) | | 50 cycle capacity retention rate (%) | |
| --- | --- | --- | --- | --- | --- | --- |
|  | 2.0 V cut | 0 V cut | 2.0 V cut | 0 V cut | 2.0 V cut | 0 V cut |
| Comp. example 11 | 0.25 | 1.8 | 2.25 | 1.8 | 85 | 58 |
| Comp. example 12 | 0.6 | 1.8 | 2.6 | 1.8 | 70 | 52 |
| Comp. example 13 | 0.8 | 1.8 | 2.8 | 1.8 | 81 | 70 |
| Example 12 | 0.6 | 1.8 | 2.6 | 1.8 | 89 | 84 |
| Example 13 | 0.6 | 1.8 | 2.6 | 1.8 | 88 | 83 |
| Example 14 | 0.6 | 1.8 | 2.6 | 1.8 | 87 | 82 |
| Comp. example 14 | 0.25 | 1.8 | 2.25 | 1.8 | 85 | 58 |
| Comp. example 15 | 0.6 | 1.8 | 2.6 | 1.8 | 70 | 52 |
| Comp. example 16 | 0.8 | 1.8 | 2.8 | 1.8 | 81 | 70 |
| Example 15 | 0.6 | 1.8 | 2.6 | 1.8 | 89 | 84 |
| Example 16 | 0.6 | 1.8 | 2.6 | 1.8 | 88 | 83 |
| Example 17 | 0.6 | 1.8 | 2.6 | 1.8 | 87 | 82 |
| Comp. example 17 | 0.25 | 1.8 | 2.25 | 1.8 | 83 | 56 |
| Comp. example 18 | 0.6 | 1.8 | 2.6 | 1.8 | 68 | 50 |
| Comp. example 19 | 0.8 | 1.8 | 2.8 | 1.8 | 79 | 68 |
| Example 18 | 0.6 | 1.8 | 2.6 | 1.8 | 87 | 82 |
| Example 19 | 0.6 | 1.8 | 2.6 | 1.8 | 86 | 81 |
| Example 20 | 0.6 | 1.8 | 2.6 | 1.8 | 85 | 80 |

TABLE 6

|  | Negative electrode potential (V) | | Positive electrode potential (V) | | 50 cycle capacity retention rate (%) | |
| --- | --- | --- | --- | --- | --- | --- |
|  | 2.0 V cut | 0 V cut | 2.0 V cut | 0 V cut | 2.0 V cut | 0 V cut |
| Comp. example 20 | 0.25 | 1.8 | 2.25 | 1.8 | 89 | 63 |
| Comp. example 21 | 0.65 | 1.8 | 2.65 | 1.8 | 73 | 57 |
| Comp. example 22 | 0.75 | 1.8 | 2.75 | 1.8 | 85 | 76 |
| Example 21 | 0.65 | 1.8 | 2.65 | 1.8 | 95 | 91 |
| Example 22 | 0.65 | 1.8 | 2.65 | 1.8 | 94 | 90 |
| Example 23 | 0.65 | 1.8 | 2.65 | 1.8 | 94 | 89 |
| Comp. example 23 | 0.25 | 1.8 | 2.25 | 1.8 | 89 | 63 |
| Comp. example 24 | 0.65 | 1.8 | 2.65 | 1.8 | 73 | 57 |
| Comp. example 25 | 0.75 | 1.8 | 2.75 | 1.8 | 85 | 76 |
| Example 24 | 0.65 | 1.8 | 2.65 | 1.8 | 95 | 91 |
| Example 25 | 0.65 | 1.8 | 2.65 | 1.8 | 94 | 90 |
| Example 26 | 0.65 | 1.8 | 2.65 | 1.8 | 94 | 89 |
| Comp. example 26 | 0.25 | 1.8 | 2.25 | 1.8 | 89 | 60 |
| Comp. example 27 | 0.65 | 1.8 | 2.65 | 1.8 | 73 | 53 |
| Comp. example 28 | 0.75 | 1.8 | 2.75 | 1.8 | 85 | 73 |
| Example 27 | 0.65 | 1.8 | 2.65 | 1.8 | 95 | 89 |
| Example 28 | 0.65 | 1.8 | 2.65 | 1.8 | 94 | 88 |
| Example 29 | 0.65 | 1.8 | 2.65 | 1.8 | 93 | 87 |
| Comp. example 29 | 0.25 | 1.8 | 2.25 | 1.8 | 87 | 58 |
| Comp. example 30 | 0.65 | 1.8 | 2.65 | 1.8 | 69 | 52 |
| Comp. example 31 | 0.75 | 1.8 | 2.75 | 1.8 | 80 | 70 |
| Example 30 | 0.65 | 1.8 | 2.65 | 1.8 | 91 | 85 |
| Example 31 | 0.65 | 1.8 | 2.65 | 1.8 | 90 | 86 |
| Example 32 | 0.65 | 1.8 | 2.65 | 1.8 | 89 | 83 |

Figure 2:
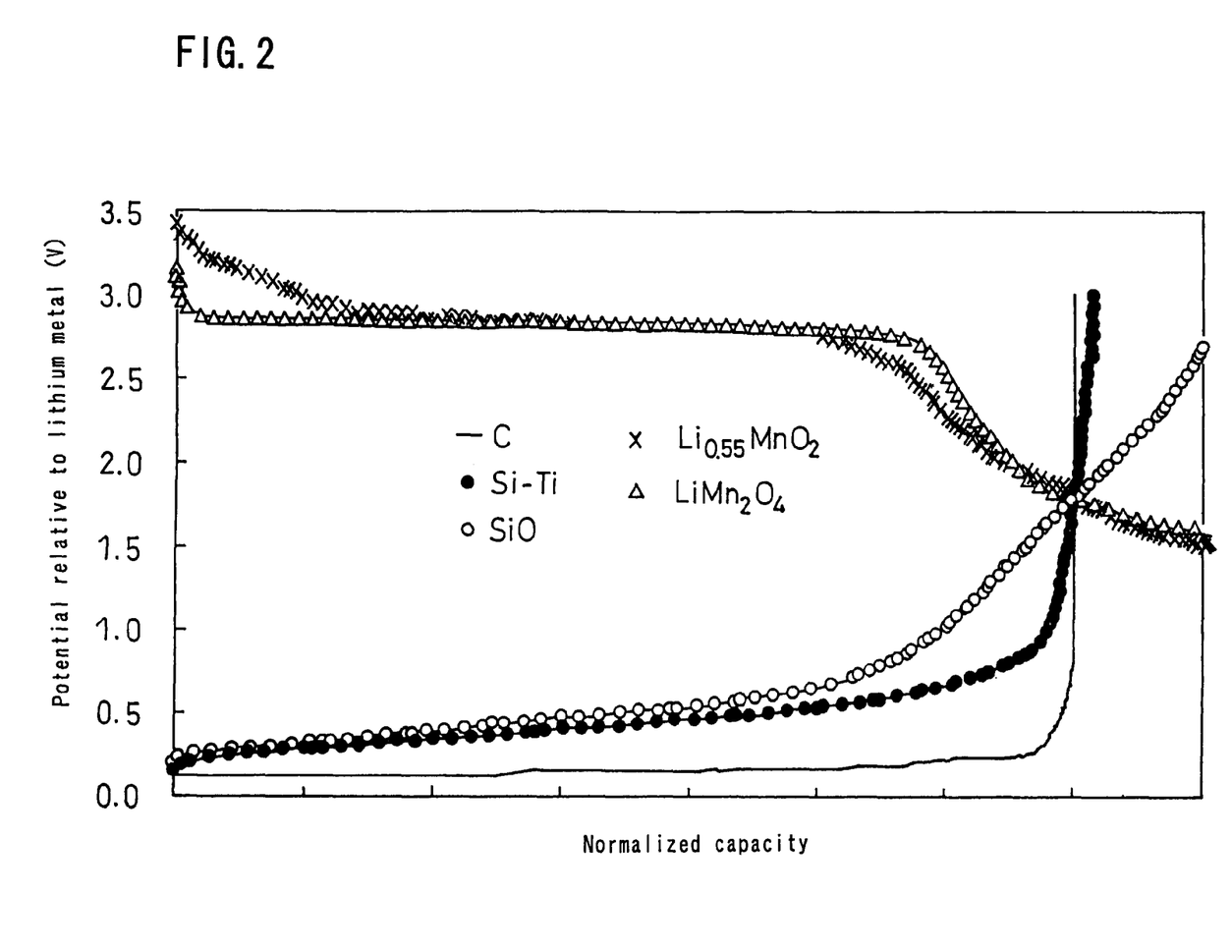
FIG. 2 is a graph showing changes in the potentials of positive and negative electrodes relative to lithium metal on initial discharge.
Figure 3:
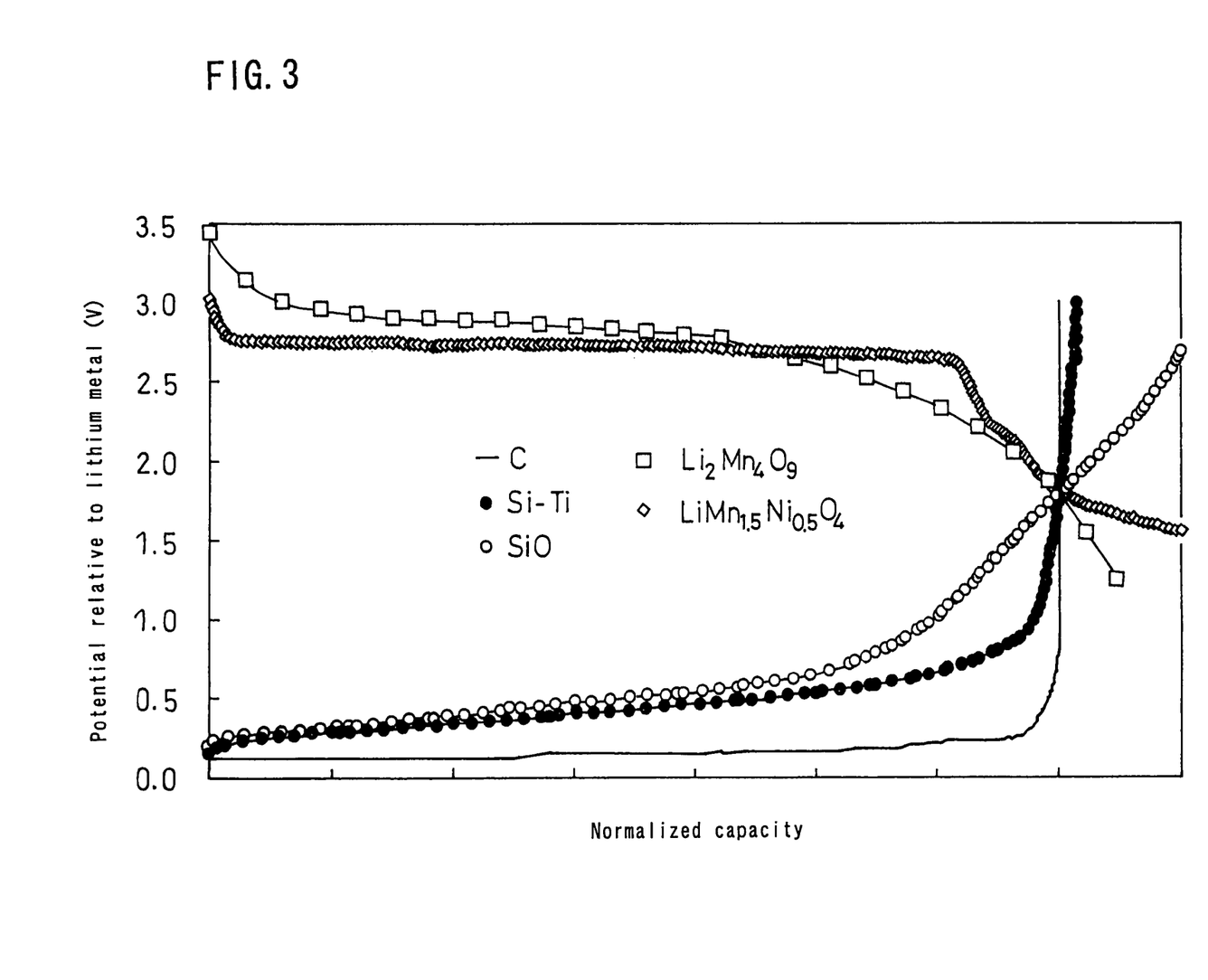
FIG. 3 is another graph showing changes in the potentials of positive and negative electrodes relative to lithium metal on initial discharge.

FIG. 2 and FIG. 3 show the electrode potentials relative to lithium metal on initial discharge of batteries that are designed such that the positive and negative electrodes have a potential of 1.8 V relative to lithium metal when the battery voltage is 0 V. It should be noted that these discharge curves are normalized such that they have the same battery capacity at the battery voltage of 0 V in order to compare the shapes of the discharge curves.

FIG. 2 shows the discharge curves of positive electrodes whose positive electrode active material is $Li_{0.55}MnO_2$ or $LiMn_2O_4$, and the discharge curves of negative electrodes whose negative electrode active material is graphite, silicon oxide, or silicon-titanium alloy (Ti:Si=15:85).

FIG. 3 shows the discharge curves of positive electrodes whose positive electrode active material is $Li_2Mn_4O_9$ or $LiMn_{1.5}Ni_{0.5}O_4$, and the discharge curves of negative electrodes whose negative electrode active material is graphite, silicon oxide, or silicon-titanium alloy (Ti:Si=15:85).

By combining a desired positive electrode and a desired negative electrode, FIG. 2 and FIG. 3 represent discharge curves of 12 batteries of Examples 2, 12, 18, and 24, Comparative Examples 3, 9, 11, 13, 17, 19, 23, and 25. For example, Comparative Example 3 is represented by the combination of the discharge curve of the $Li_{0.55}MnO_2$ positive electrode and the discharge curve of the graphite negative electrode. For example, Example 2 is represented by the combination of the discharge curve of the $Li_{0.55}MnO_2$ positive electrode and the discharge curve of the silicon-titanium alloy negative electrode.

The discharge curve of the positive electrode whose positive electrode active material is $Li_2Mn_4O_9$ is almost the same as the discharge curve of the positive electrode whose positive electrode active material is $Li_4Mn_5O_{12}$, $Li_2Mn_3NiO_9$ or $Li_4Mn_{3.75}Ni_{1.25}O_{12}$. The discharge curve of the negative electrode whose negative electrode active material is composed simply of silicon is almost the same as the discharge curve of the negative electrode whose negative electrode active material is the silicon-titanium alloy. Therefore, FIG. 2 and FIG. 3 substantially represent the discharge curves of the positive and negative electrodes on initial discharge of batteries of Comparative Examples 3, 6, 9, 11 to 19 and 23 to 31, and Examples 2 to 20 and 24 to 32.

(i) COMPARATIVE EXAMPLES 2 TO 4

In Comparative Examples 2 to 4, $Li_{0.55}MnO_2$ was used as the positive electrode active material, and graphite was used as the negative electrode active material. Battery voltage is determined by the difference in the potential between the positive electrode and the negative electrode. When the battery voltage is 0.0 V, the positive electrode and the negative electrode in Comparative Example 2 have a potential of 2.0 V, and the positive electrode and the negative electrode in Comparative Example 3 have a potential of 1.8 V. Also, the positive electrode and the negative electrode in Comparative Example 4 have a potential of 1.5 V. The capacities of these batteries are 4.5 mAh. The reason why the battery capacities were set to 4.5 mAh is that when the negative electrode active material is graphite, the capacity density per negative electrode volume is low. It is thus impossible to produce a battery with a design capacity of 7 mAh under the same conditions as those of Examples.

When the batteries were cycled with the discharge being cut off at the voltage of 2.0 V, Comparative Examples 2 to 4 exhibited relatively good capacity retention rates. However, when the batteries were cycled with the discharge being cut off at the voltage of 0.0 V, Comparative Examples 2 to 4 exhibited lower capacity retention rates. This is because repetitive cycles with the negative electrode potential being 0.25 V or higher relative to lithium metal caused the graphite to deteriorate.

In Comparative Example 4, the potentials of the positive and negative electrodes relative to lithium metal at the battery voltage of 0 V were designed to be 1.5 V. In this case, when the battery was cycled with the discharge being cut off at the voltage of 0.0 V, the capacity retention rate was significantly low. This is because repetitive cycles with the positive electrode potential being 1.8 V or lower relative to lithium metal caused the positive electrode active material to deteriorate. Comparative Examples 1, 7 and 10 also exhibited the same tendency as that of Comparative Example 4.

(ii) COMPARATIVE EXAMPLES 5 TO 7

In Comparative Examples 5 to 7, $Li_{0.55}MnO_2$ was used as the positive electrode active material, and silicon was used as the negative electrode active material. In the case of the silicon negative electrode active material, even when the batteries are cycled with the discharge being cut off at the voltage of 2.0 V, the capacity retention rates are relatively low. This is because the negative electrode active material undergoes large volume changes during charge/discharge. Thus, it appears difficult to maintain the current-collecting structure in the electrode plates in these Comparative Examples. When the batteries are cycled with the discharge being cut off at the voltage of 0.0 V, the volume change of the negative electrode active material further increases, thereby resulting in a decrease in capacity retention rate.

(iii) COMPARATIVE EXAMPLES 8 TO 10

In Comparative Examples 8 to 10, $Li_{0.55}MnO_2$ was used as the positive electrode active material, and SiO was used as the negative electrode active material. The SiO active material undergoes smaller volume changes during charge/discharge than silicon, but when the batteries are cycled with the discharge being cut off at the voltage of 0.0 V, the capacity retention rates are low. This is attributed to the above-mentioned significant increase in the amount of coating film formed on the negative electrode active material surface. This is related to the fact that in a charged state, the negative electrode active material contains a lithium-silicon alloy with a low electronic resistance, but that in a deeply discharged state, the electronic resistance of the lithium-silicon alloy significantly increases.

(iv) EXAMPLES 1 to 11

In Examples 1 to 11, $Li_{0.55}MnO_2$ was used as the positive electrode active material, and a silicon-transition metal alloy was used as the negative electrode active material. In these Examples, even when the batteries are cycled with the discharge being cut off at the voltage of 0.0 V, the deterioration of the capacity retention rate is significantly suppressed. As described above, the reason for this is probably that the significant increase in the amount of coating film on the negative electrode active material surface is not observed, and that the low electronic resistance of the silicon-transition metal compound phase permits suppression of an increase in the electronic resistance of the negative electrode active material toward the end of discharge.

For example, the silicon-titanium alloy contains a silicon phase and a titanium disilicide phase with a low electronic resistance. The powder electronic resistance of the silicon-titanium alloy is $10^{-4}$ to $10^{-7}$ times as that of silicon.

In Example 3, the weight ratio between the titanium disilicide phase and the silicon phase is 99:1 on the assumption that all the titanium formed titanium disilicide. Due to the small silicon content, the capacity density per volume is also small. Thus, the battery of Example 3 was designed so as to have a capacity of 4.5 mAh at the battery voltage of 0 V.

In Example 8, the weight ratio between the titanium disilicide phase and the silicon phase is 7:93 on the assumption that all the titanium formed titanium disilicide. Due to the large silicon content, the active material particles undergo large volume changes during charge/discharge. It is thus difficult to maintain the current-collecting structure in the electrode plates in Example 8. Therefore, when the battery is cycled with the discharge being cut off at the voltage of 0.0 V, the deterioration of the capacity retention rate increases slightly.

Examples 10 and 11 demonstrate that the use of nickel or iron as the transition metal also produces essentially the same effect as the use of titanium.

(v) OTHER EXAMPLES AND COMPARATIVE EXAMPLES

The use of $LiMn_2O_4$ (Comparative Examples 11 to 13 and Examples 12 to 14), $Li_4Mn_5O_{12}$ (Comparative Examples 14 to 16 and Examples 15 to 17), $Li_2Mn_4O_9$ (Comparative Examples 17 to 19 and Examples 18 to 20), $Li_{0.55}Mn_{0.75}Ni_{0.25}O_2$ (Comparative Examples 20 to 22 and Examples 21 to 23), $LiMn_{1.5}Ni_{0.5}O_4$ (Comparative Examples 23 to 25 and Examples 24 to 26), $Li_4Mn_{3.75}Ni_{1.25}O_{12}$ (Comparative Examples 26 to 28 and Examples 27 to 29), and $Li_2Mn_3NiO_9$ (Comparative Examples 29 to 31 and Examples 30 to 32) as the positive electrode active material also produced essentially the same results as the use of $Li_{0.55}MnO_2$ (Comparative Examples 2 to 10 and Examples 1 to 11).

As described above, the present invention can provide a non-aqueous electrolyte secondary battery with high capacity and excellent deep discharge cycle life.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:
1. A non-aqueous electrolyte secondary battery comprising a positive electrode, a negative electrode, and a non-aqueous electrolyte, wherein:
   said positive electrode includes a positive electrode active material that comprises a lithium-containing manganese oxide,
   said negative electrode includes a negative electrode active material that comprises silicon and a transition metal element,
   said negative electrode comprises a molded negative electrode mixture that contains said negative electrode active material, and said molded negative electrode mixture has a thickness of 0.05 mm to 2.0 mm,
   said positive electrode comprises a molded positive electrode mixture that contains said positive electrode active material, and said molded positive electrode mixture has a thickness of 0.30 mm to 3.0 mm,
   the battery is in a coin shape,
   when the battery voltage is 0 V, said positive electrode and said negative electrode have a potential of 1.8 V or higher relative to lithium metal (Li/Li+), and
   the negative electrode and the positive electrode are designed so that capacity of said negative electrode is smaller than capacity of said positive electrode for capacity of the battery to be limited by the capacity of said negative electrode.
2. The non-aqueous electrolyte secondary battery in accordance with claim 1, wherein said lithium-containing manga- nese oxide comprises at least one selected from the group consisting of $Li_{0.55}MnO_2$, $LiMn_2O_4$, $Li_4Mn_5O_{12}$, and $Li_2Mn_4O_9$.

3. The non-aqueous electrolyte secondary battery in accordance with claim 1, wherein said transition metal element comprises at least one element selected from the group consisting of titanium, nickel, and iron.

4. The non-aqueous electrolyte secondary battery in accordance with claim 1, wherein the molar ratio between said silicon and said transition metal element is 67:33 to 98:2.

5. The non-aqueous electrolyte secondary battery in accordance with claim 1, wherein the molar ratio between said silicon and said transition metal element is 74:26 to 95:5.

6. The non-aqueous electrolyte secondary battery in accordance with claim 1, wherein part of the manganese contained in said lithium-containing manganese oxide is replaced with an element Me, and Me comprises at least one element selected from the group consisting of nickel and iron.

7. The non-aqueous electrolyte secondary battery in accordance with claim 6, wherein the molar ratio of said element Me to the manganese contained in said lithium-containing manganese oxide is ⅓ or less.

8. The non-aqueous electrolyte secondary battery in accordance with claim 1, wherein said lithium-containing manganese oxide comprises at least one selected from the group consisting of $Li_{0.55}MnO_2$, $Li_4Mn_5O_{12}$, and $Li_2Mn_4O_9$.

9. The non-aqueous electrolyte secondary battery in accordance with claim 8, wherein part of the manganese contained in said lithium-containing manganese oxide is replaced with an element Me, and Me comprises at least one element selected from the group consisting of nickel and iron, wherein the molar ratio of said element Me to the manganese contained in said lithium-containing manganese oxide is ¼ or less.

10. The non-aqueous electrolyte secondary battery in accordance with claim 5, wherein the molar ratio between said silicon and said transition metal element is 74:26 to 85:15, and said transition metal element is titanium.

* * * * *